US 6,561,527 B2

(12) United States Patent
Spadino (10) Patent No.: US 6,561,527 B2
(45) Date of Patent: May 13, 2003

(54) HYBRID GOLF BAG TECHNOLOGY

(76) Inventor: Daniel T. Spadino, 816 Larsen La., Hudson, WI (US) 54016

(*) Notice: Subject to any disclaimer, the term of this patent is extended or adjusted under 35 U.S.C. 154(b) by 0 days.

(21) Appl. No.: 09/803,809

(22) Filed: Mar. 12, 2001

(65) Prior Publication Data

US 2001/0045717 A1 Nov. 29, 2001

Related U.S. Application Data (60) Provisional application No. 60/188,487, filed on Mar. 10, 2000.

(51) Int. Cl.[7] .................................................. B62B 1/12
(52) U.S. Cl. ................................. 280/47.26; 280/43.16; 280/43.17; 280/655.1
(58) Field of Search ........................... 280/DIG. 6, 652, 280/655, 655.1, 43.1, 43.15, 43.16, 43.17, 47.26, 47.315

(56) References Cited

U.S. PATENT DOCUMENTS

| | | | | |
|---|---|---|---|---|
| 2,556,814 A | * | 6/1951 | Love | 280/DIG. 6 |
| 2,868,559 A | * | 1/1959 | Vincelette | 280/DIG. 6 |
| 3,953,045 A | * | 4/1976 | Feret et al. | 280/DIG. 6 |
| 5,112,068 A | | 5/1992 | Liao et al. | |
| 5,180,087 A | * | 1/1993 | Lee | 280/DIG. 6 |
| 5,421,604 A | * | 6/1995 | Wu | 280/DIG. 6 |
| 5,435,581 A | | 7/1995 | Rosenfield | |
| 5,454,576 A | * | 10/1995 | Pitkanen | 280/DIG. 6 |
| 5,470,095 A | | 11/1995 | Bridges | |
| 5,478,097 A | * | 12/1995 | Forma | 280/DIG. 6 |
| 5,582,421 A | * | 12/1996 | Liu | 280/DIG. 6 |
| 5,879,022 A | * | 3/1999 | Winton | 280/DIG. 6 |
| 5,924,709 A | | 7/1999 | Yang | |
| 6,007,031 A | * | 12/1999 | Tang | 280/DIG. 6 |
| 6,050,592 A | * | 4/2000 | Kim | 280/DIG. 6 |
| 6,056,301 A | * | 5/2000 | Berliner et al. | 280/DIG. 6 |
| 6,168,123 B1 | * | 1/2001 | Stein et al. | 280/DIG. 6 |
| 6,186,520 B1 | * | 2/2001 | Barten | 280/DIG. 6 |
| 6,193,264 B1 | * | 2/2001 | Seon | 280/DIG. 6 |

OTHER PUBLICATIONS

Metro Golf Manufacturing SDN. BHD., Golfer's Friend, Brochure, 3 pages.

* cited by examiner

Primary Examiner—Brian L. Johnson
Assistant Examiner—Jeffrey Restifo
(74) Attorney, Agent, or Firm—Skinner and Associates (57) ABSTRACT

A hybrid golf bag, includes a conventional golf bag body with an open top and a closed bottom, a wheel mount attached to the bottom, at least two wheels rotatably connected to the wheel mount, and handle means attached to the golf bag body. The handle means are selectively adapted for both carrying and pulling the golf bag body. The golf bag body has a periphery and at least two wheels that extend outside of the periphery. The wheels have a retracted position proximate to the periphery and an extended position away from the periphery. The handle means includes a shoulder strap adapted to be used for carrying the golf bag body, and a rigid push/pull handle that has an extended position and a retracted position.

12 Claims, 11 Drawing Sheets

HYBRID GOLF BAG TECHNOLOGY

CROSS-REFERENCE TO RELATED APPLICATIONS, IF ANY

This application claims the benefit under 35 U.S.C. §119(e) of provisional application Serial No. 60/188,487, filed Mar. 10, 2000, which is hereby incorporated by reference.

37 C.F.R. §1.71(e) AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to the golf industry. More particularly, the invention relates to golf bags. The invention has particular utility as a multi-functional, configurable, all-in-one or hybrid bag designed to be either carried off the ground, pulled along the ground by the user, or stowed on a power cart.

2. Background Information

The state of the art includes various devices and methods for carrying a golf bag, pulling a golf bag or carting a golf bag.

The known devices and methods are believed to have significant limitations and shortcomings. Specifically, pull carts are relatively heavy, bulky and time-consuming. They tend to be relatively heavy because of the extra framework used to rest and attach the golf bag. They tend to be bulky also due to the extra framework. For example, golfer(s) need to fit both their pull cart(s) and their golf bag(s) into their vehicle. This problem is exacerbated if multiple golfers travel in the same vehicle. Finally, the golf carts are time-consuming. They often require at least some assembly or manipulation at the golf course and require effort and time to attach the golf bag to the cart.

The present invention provides a golf bag which is believed to constitute an improvement over the known art.

BRIEF SUMMARY OF THE INVENTION

The present invention provides a golf bag which generally comprises a conventional golf bag body with an open top and a closed bottom, a wheel mount attached to the bottom, at least two wheels rotatably connected to the wheel mount, and handle means that are attached to the golf bag body and are adapted for carrying and pulling the golf bag body.

At least two wheels extend outside of the periphery of the golf bag body. The wheels have a retracted position proximate to the periphery and an extended position away from the periphery. A wheel latching mechanism secures the wheels in the desired position, depending on whether the golf bag is being pulled or whether the golf bag is being carried, stowed in a powered golf cart, or stored. The wheel mount is formed with a wheel axle adapted to securely receive the two wheels.

The handle means includes a shoulder strap adapted to be used for carrying the golf bag body, and further includes a push pull handle. The push/pull handle is preferably rigid. The rigid push/pull handle has an extended position and a retracted position. A handle latching mechanism secures the rigid push/pull handle in the retracted position and in the extended position.

The golf bag body preferably includes a stand. The stand has a normally retracted position. The stand also has an extended position to enable the golf bag body to stand in a stable, unattended position, wherein the wheels and the stand rest on the ground. In one embodiment, the stand moves into and maintains the extended position when the golf bag body is set down. In another embodiment, the stand is extended by hand actuation by the user.

The golf bag of the present invention provides a bag that can be configured in a variety of sizes and shapes (from the smallest "Sunday" bag to the largest "Cart" or "Tour" bag) to give golfer the option of either carrying or pulling his or her clubs, or riding in a powered golf cart wherein the golf bag is stowed (typically at the rear of the golf cart), and that eliminates the hassles of heavy and bulky pull carts including the time to attach and detach a bag to the pull cart and the extra vehicle space required to store and haul a pull cart.

The features, benefits and objects of this invention will become clear to those skilled in the art by reference to the following description, claims, and drawings.

DETAILED DESCRIPTION

Referring to FIGS. 1–9, an embodiment of the hybrid golf bag of the present invention is illustrated.

The golf bag 10 generally comprises a conventional golf bag body 12 with an open top 14 and a closed bottom 15, a wheel mount 16 attached to the bottom 15, at least two wheels 18 rotatably connected to the wheel mount 16, and handle means 20 attached to the golf bag body 12 and adapted for carrying and pulling the golf bag body 12.

Figure 1:
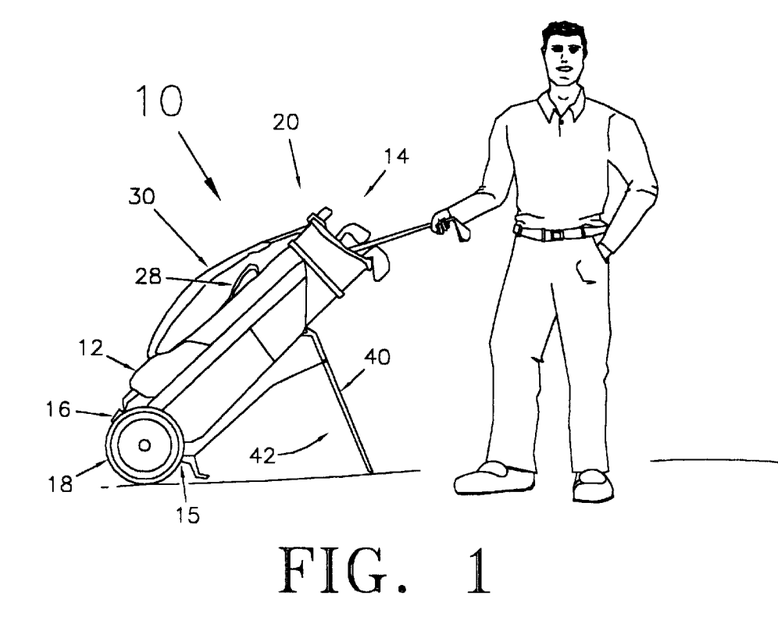
FIG. 1 is a side view of the golf bag of the present invention in a stand position.
Figure 2:
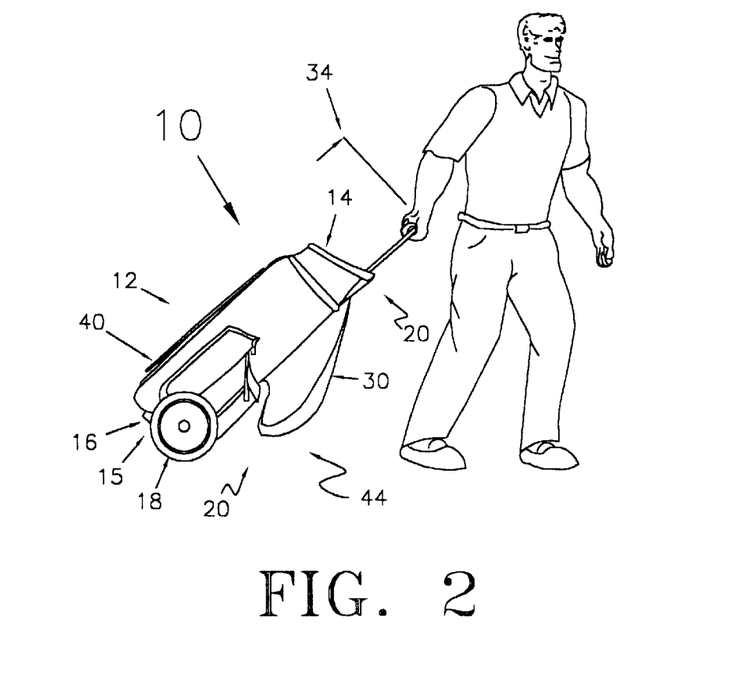
FIG. 2 is a side view of the golf bag of FIG. 1 in a pull position.
Figure 3:
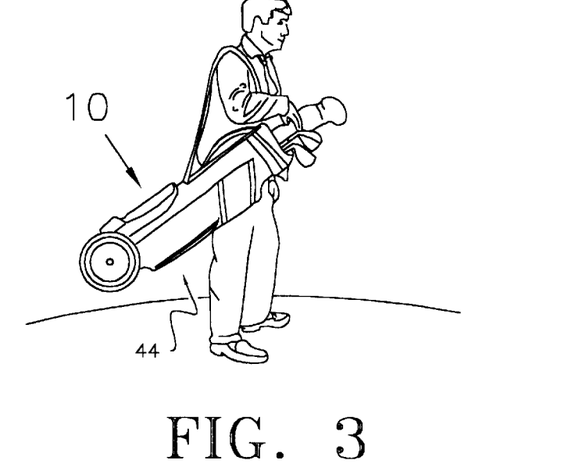
FIG. 3 is a side view of the golf bag of FIG. 1 in a carry position.
Figure 4:
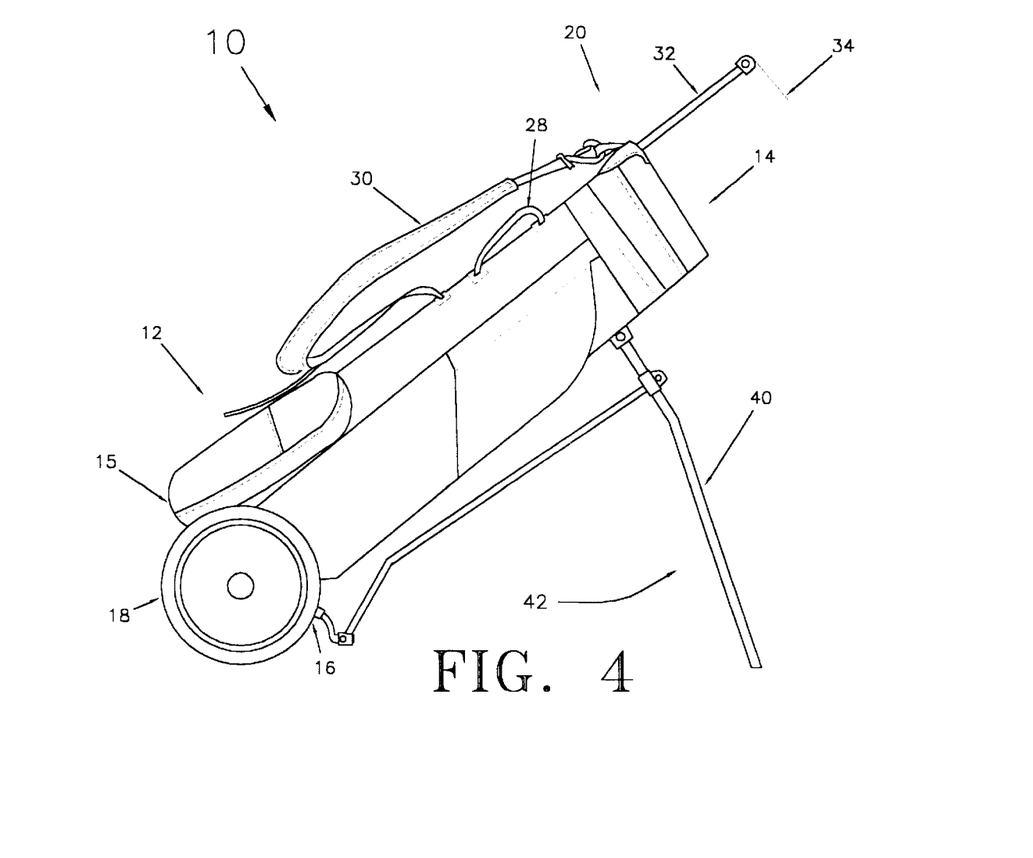
FIG. 4 is a side view of the golf bag of FIG. 1 in a stand position and is shown with an extended handle.
Figure 5:
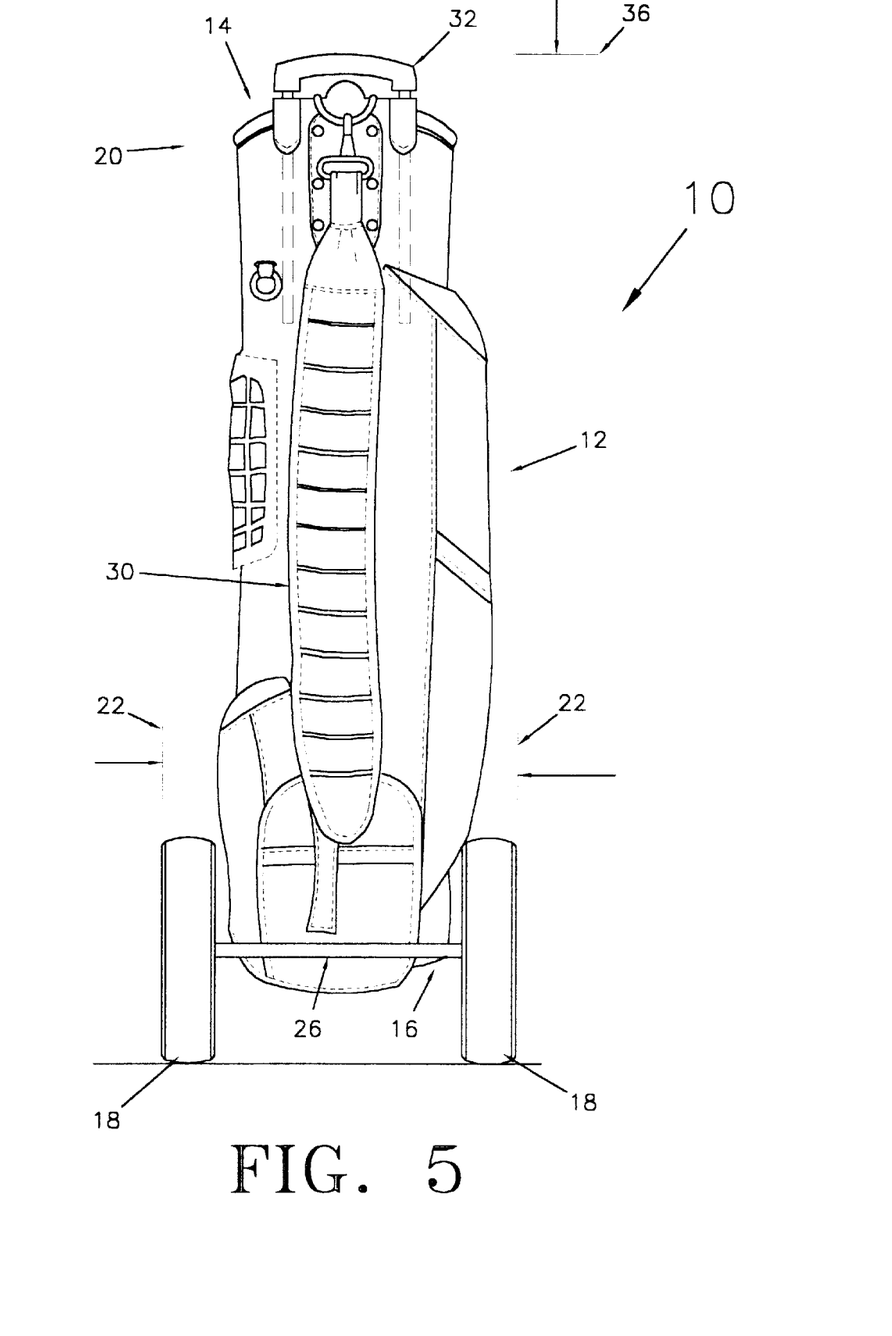
FIG. 5 is a rear view, partially in cross section to show a wheel axle, of the golf bag of FIG. 1 illustrating the wheels in a retracted position.
Figure 6:
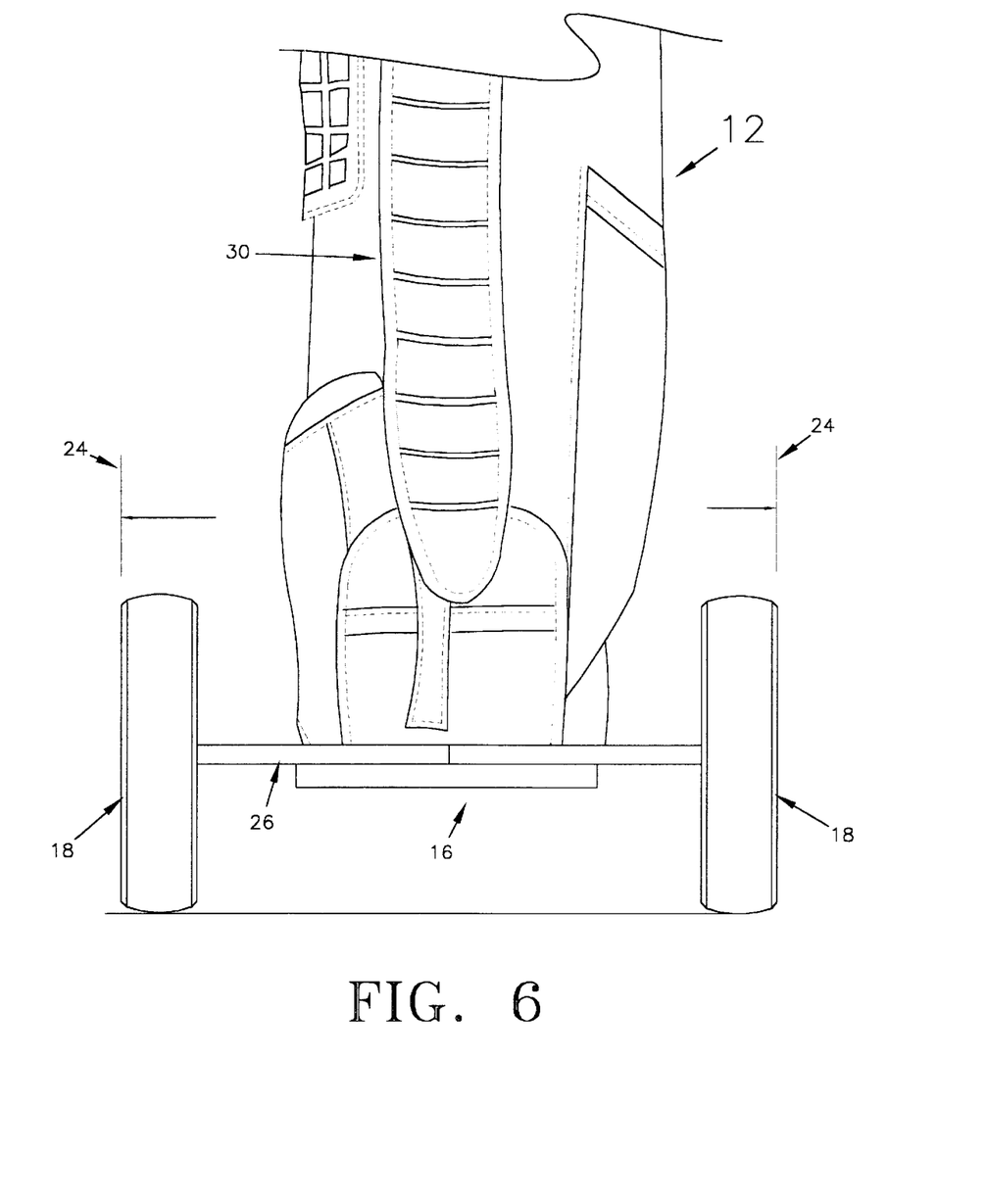
FIG. 6 is a rear view, partially in cross section to show the wheel axle, of the golf bag of FIG. 4 illustrating the wheels in an extended position.
Figures 7, 8:
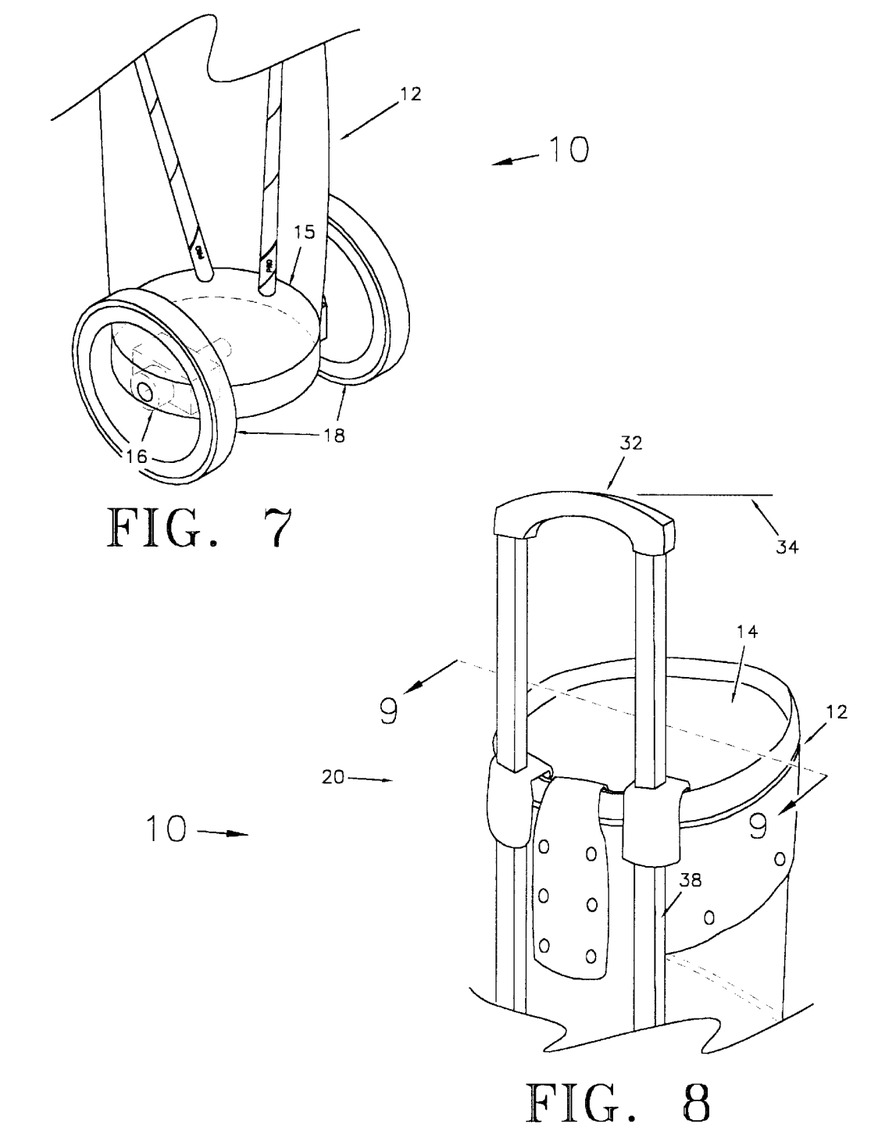
FIG. 7 is a perspective view of the bottom of the golf bag illustrating the position of the wheel axle with respect to the bottom of the bag and golf club handles.
FIG. 8 is a perspective view of the handle in an extended position.

Preferably two wheels 18 extend outside of the periphery of the golf bag body 12. The wheels 18 have a retracted position 22, as shown in FIG. 5, proximate to the periphery, and an extended position 24, as shown in FIG. 6, away from the periphery of the golf bag body 12. The wheels 18 are typically retracted when the golf bag 10 is carried, stored at home, or loaded into a vehicle or a power cart. The wheels 18 are typically extended when the golf bag 10 is pulled. Extending the wheels lowers the center of gravity for the bag, which makes the bag more stable, i.e. less tipsy, when it is pulled over the terrain of a golf course. Because the retracted position of the wheels 18 is outside of the periphery of the golf bag body 12, larger diameter wheels may be used. Larger wheels are advantageous to navigate rougher terrain as that encountered on typical golf courses.

A wheel latching mechanism or locking device secures the wheels 18 in the desired position 22 or 24, depending on whether the golf bag 10 is being pulled or whether the golf bag 10 is being carried or stored. The wheel latching mechanism also prevents the wheels 18 from either falling out or being pulled out of the wheel mount 16. The wheel latching mechanism may take a variety of designs. One design is a telescoping design, wherein the axle of each wheel either fits within or fits over an axle in the wheel mount 16. In this design, for example, the axle of each wheel is held in the desired extended or retracted position by a tongue and groove, or detent relationship.

The wheel mount 16 is formed with a wheel axle 26 adapted to securely receive the two wheels 18. Alternatively, each wheel may have its own axle that is rotatably received by a socket or by some other reception means in the wheel mount 16.

Figure 9:
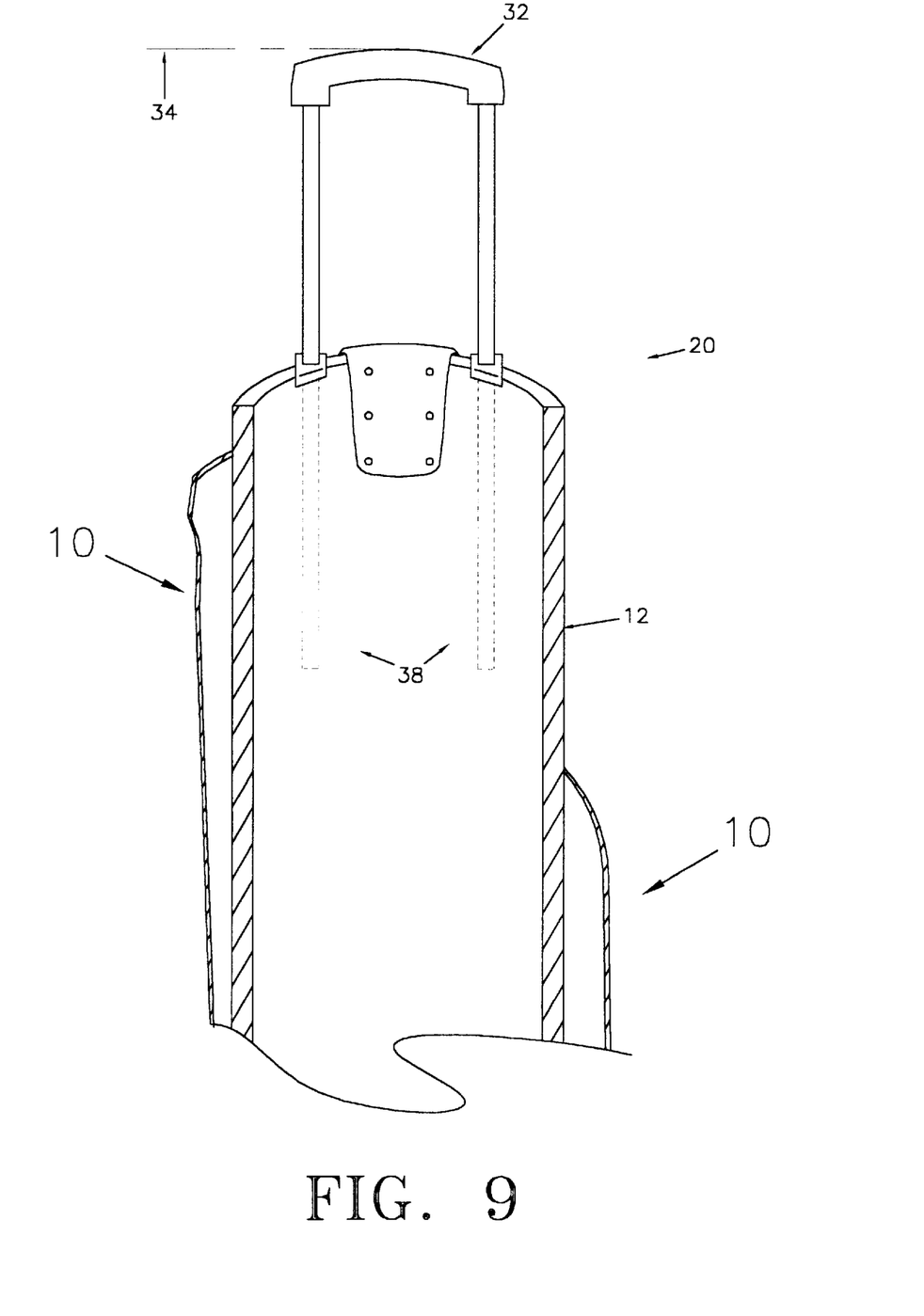
FIG. 9 a view of the inside of the golf bag taken along line 9—9 of FIG. 8.
Figure 10:
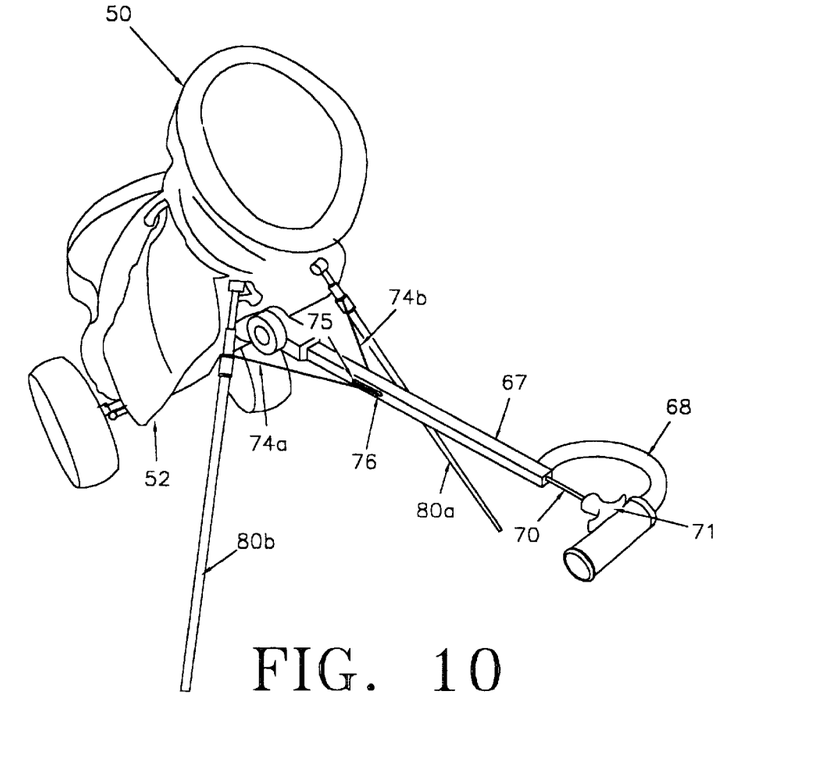
FIG. 10 is a perspective view of an alternative embodiment of the golf bag of the present invention, shown with the legs extended to stand the bag upright.
Figure 11:
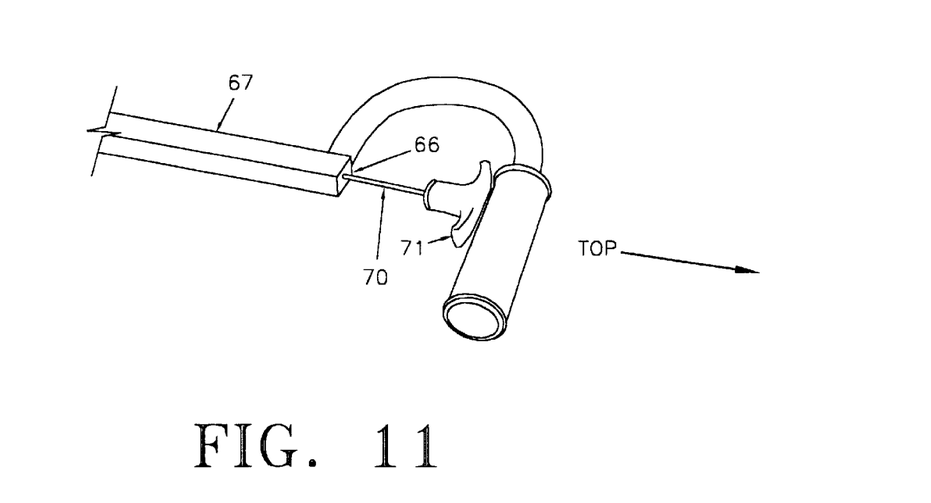
FIG. 11 is a perspective view of the distal or handle end of the arm of the golf bag embodiment of FIG. 10, shown in the legs extended position.
Figure 12:
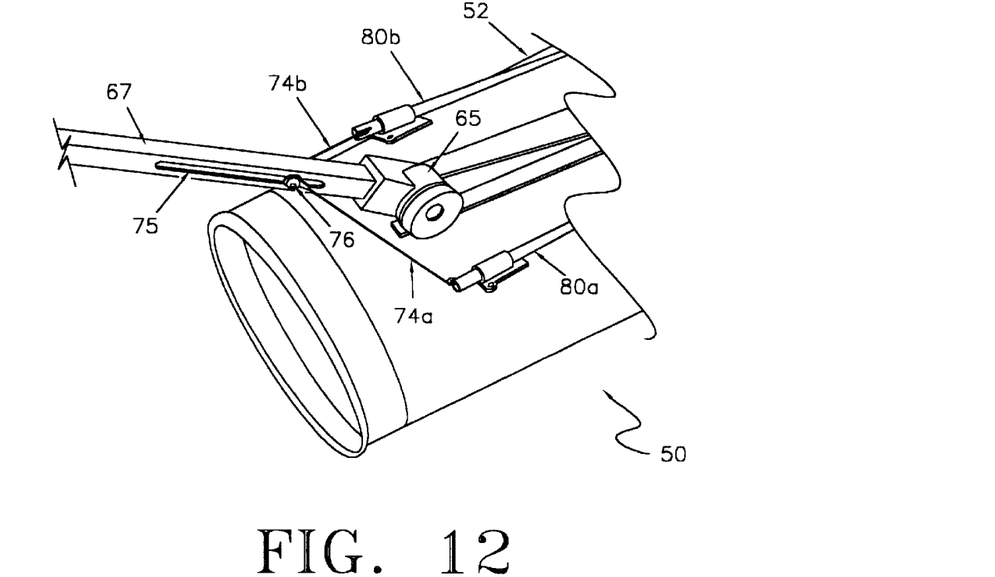
FIG. 12 is a perspective view, from the left side thereof, of the proximal end of the arm of the golf bag embodiment of FIG. 10, shown with the legs retracted for carrying or pulling.
Figure 13:
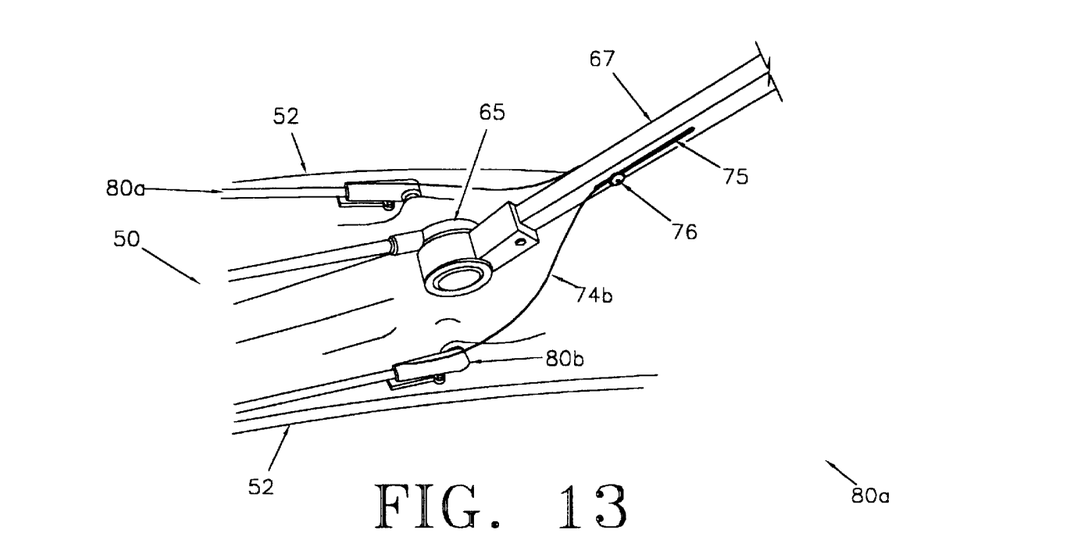
FIG. 13 is a perspective view, from the right side thereof, of the proximal end of the arm of the golf bag embodiment of FIG. 10, shown with the legs retracted.
Figure 14:
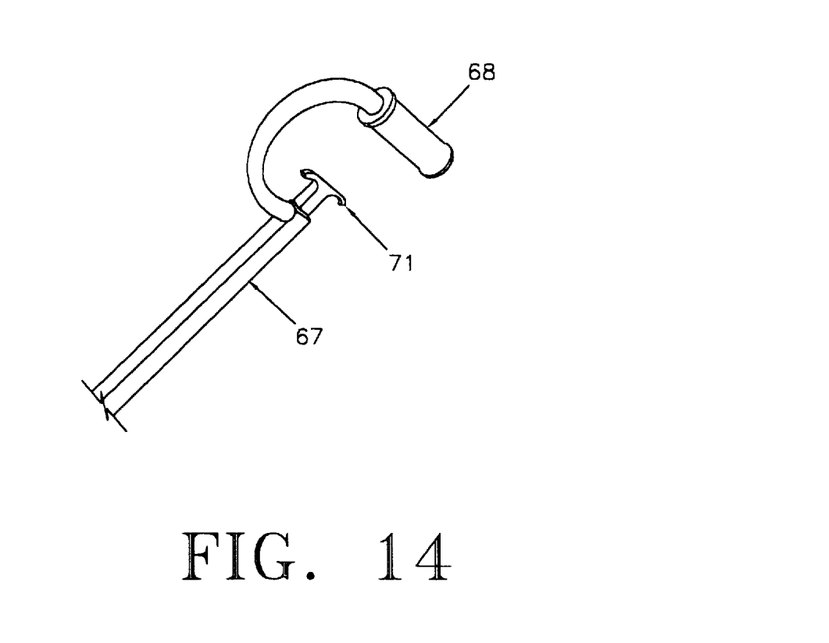
FIG. 14 is a perspective view of the distal or handle end of the arm of the golf bag embodiment of FIG. 10, shown in the legs retracted position.

The handle means 20 includes carrying straps adapted to be used for carrying the golf bag body, and further includes a push/pull handle 32 adapted for pulling and pushing the golf bag body. The carrying straps are conventional carrying straps, including a handle 28 and either a single or double shoulder strap 30. The push/pull handle 32 is preferably rigid. The rigid push/pull handle 32 has an extended position 34 as shown in FIGS. 2, 4, 8 and 9 and a retracted position 36 as shown in FIG. 5 for carrying or storing at home, in a vehicle, or in a power cart. A handle latching mechanism or handle locking device secures the rigid push/pull handle 32 in the retracted position 36 and in the extended position 34. As shown in FIG. 9, the handle 32 of this embodiment extends into and slides within sleeves 38.

The golf bag body 12 preferably includes a stand 40. The stand 40 is adapted to enable the golf bag body 12 to stand in a stable, unattended position on the ground resting on both the stand 40 and on the bottom of the golf bag body 12 or the wheels 18. The stand 40 also has an extended position 42 and a retracted position 44. The stand 40 is in the extended position when the golf bag body stands in a stable, unattended position. The stand 40 is in a normally retracted position to make it well-suited for being carried or stored at home, in a vehicle or in a power cart. The stand 40 moves into and maintains an extended position when the golf bag body 12 is set down. A number of mechanisms may be used to move the stand between the extended and retracted positions. One such mechanism includes a plunger-like device or lever located on the bottom of the bag body. Placing the bag on the ground actuates the lever to extend the stand. The lever is biased to move the stand into the retracted position when the bag is picked up. Alternatively, the stand may be operably connected to either the shoulder strap and/or to the push/pull handle. In this situation, for example, the stand may be biased into a normally extended position, and retracts when a lifting force is applied to the shoulder strap or when the push/pull handle is extended.

The golf bag 12 may include most any of the variations that currently exist in golf bags, such as one or two straps, places to hold water battles, different size pockets, and designs for men, women and children.

FIGS. 10–17 illustrate an alternative embodiment of the golf bag of the present invention, which includes an alternative design for the pulling handle assembly, leg actuator assembly, and wheel base assembly.

The golf bag 50 has a semi flexible common bag body 52 which is connected to a rigid frame structure 53. The frame structure 53 includes a base 55 which is connected to the bag body 52 and to an axle assembly 57. Wheels 58 a and b are connected to the axle assembly. A plate 59 is connected to the base 55. A post 61 extends from the plate 59. A post bracket 63 is connected to the extended end of the post 61. A rotary hinge 65 is connected to the post bracket 63 at one of its ends. A handle 67 is connected to the opposite end of the rotary hinge 65. The handle 67 has a hollow interior channel portion 66 and an ergonomic distal end 68. A leg pull handle 69 has a body 70 which is longitudinally movably disposed in the channel 66. An ergonomic actuator 71 is disposed at the distal end of the body 70 which extends out of the channel 66. A block 72 is disposed at the proximal end of the body 70 and is movably resident in the channel 66. The block 72 has a connection apertures 73. A pair of cords 74a and b are connected to the blocks 72, preferably via looped ends disposed around screws 76 which mate with the apertures 73 in the blocks 72. The cords 74 extend outwardly from the block 72 and though a pair of opposing slots 75 in the handle 67. The cords 74a and b are connected to legs 80a and b.

This handle assembly 66–76 permits fast and easy hand actuatable deployment of the legs 80 by the user.

Yet another embodiment of the handle/leg assembly (not shown) involves attaching the pull handle to the main supporting rod via a portion that extends from the rod and acts as a receiver for a handle that has a quick release element, whereby the handle is completely detachable from the bag. Such an embodiment would further have quick release elements (such as snap buttons or a pin system) with respect to the cables and the legs.

These components have dimensions and configurations that vary depending upon the particular bag body 52 style and dimensions.

Figure 15:
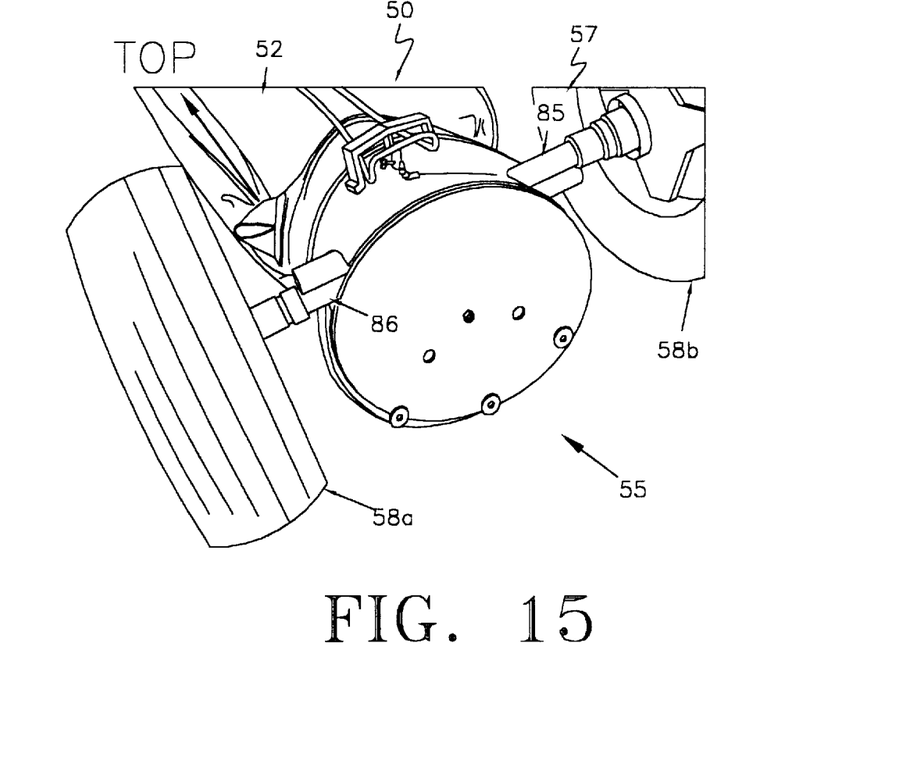
FIG. 15 is a perspective view of the base of the golf bag embodiment of FIG. 10 showing the axle housing, axles and wheels in a retracted position.
Figure 16:
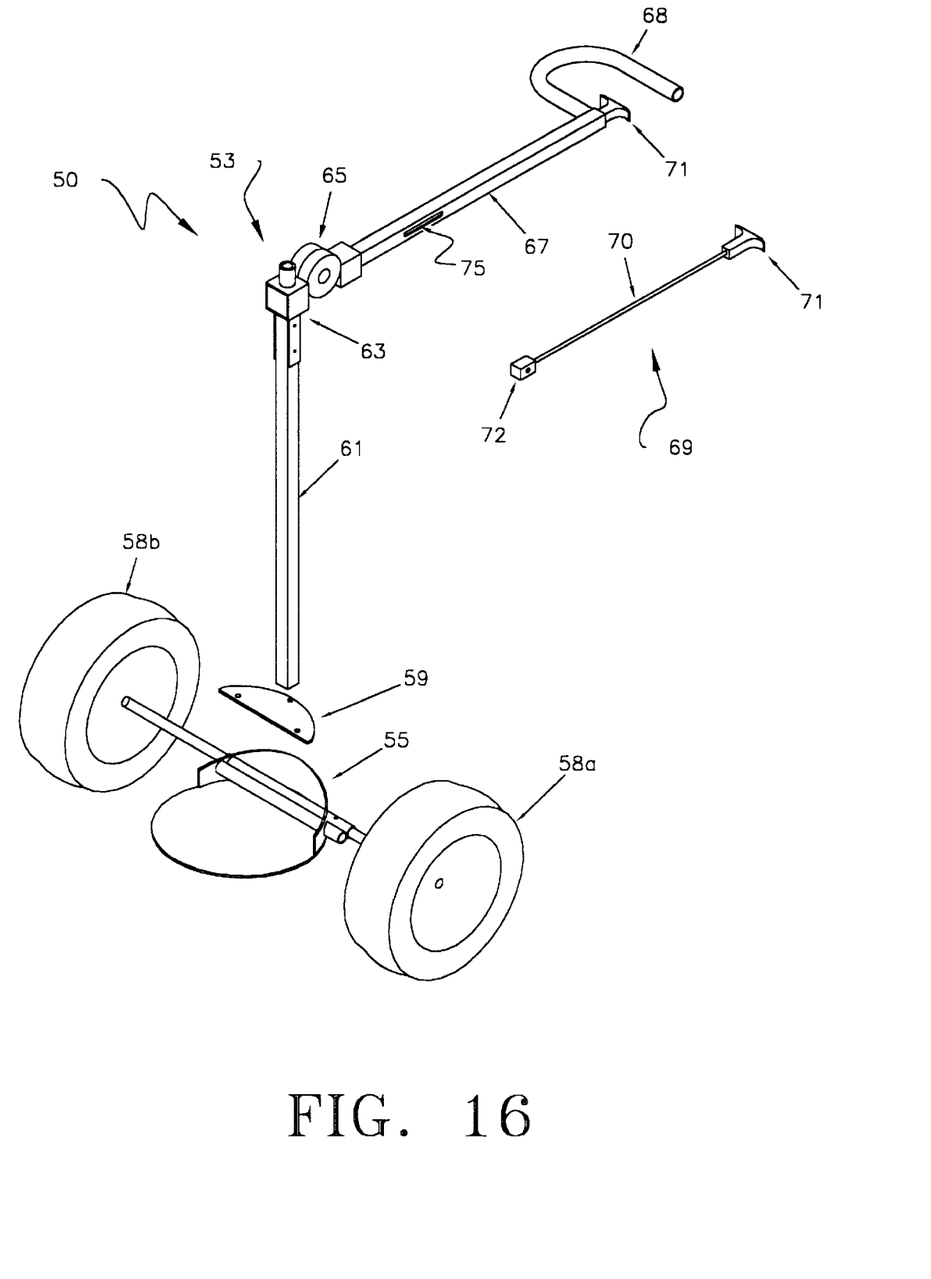
FIG. 16 is a perspective view of certain components of the golf bag embodiment of FIG. 10, wherein the bag elements are removed to clarify the wheel and handle components thereof.
Figure 17A:
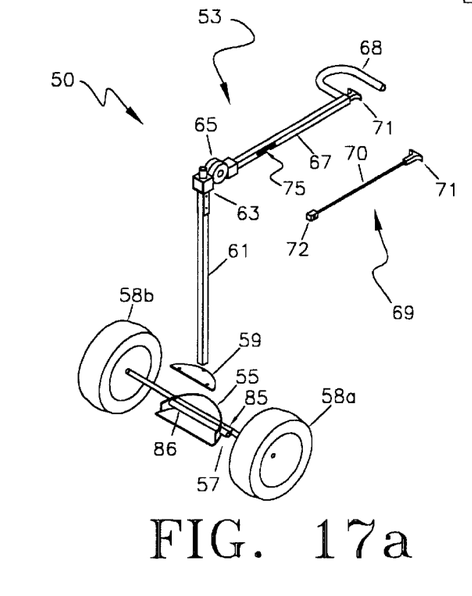
FIGS. 17A–H ("and"), respectively, illustrate component details.
Figure 17B:
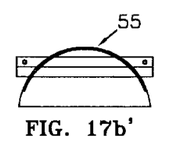
Figure 17C:
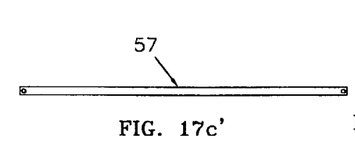
Figure 17D:
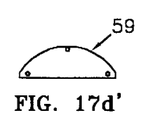
Figure 17E:
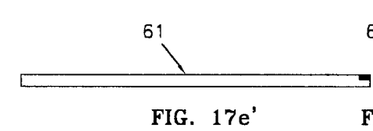
Figure 17F:
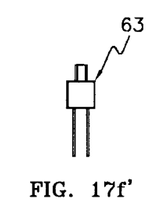
Figure 17G:
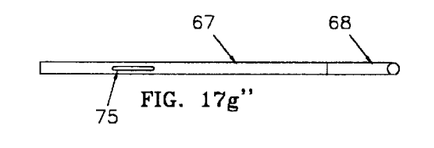
Figure 17H:
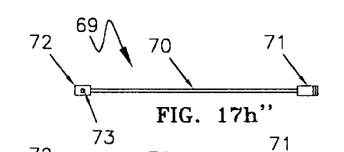

The axle assembly 57 is preferably constructed of a pair of tandem sleeves 85 and 86. This permits wheel axles of a predetermined length to be inserted into one single sleeve 85 as shown in FIGS. 16 and 17 when the wheels 58 are extended and to be inserted into separate sleeves 85 and 86 as is shown in FIG. 15 when the wheels 58 are retracted. Snap pins are preferably utilized to capture the wheel axles into the sleeves. Such pins permit secure, positive attachment, but also allow quick detachment. The detached wheels may be placed in the tandem axles 85 and 85 so that they remain with the bag, or they may be stowed away from the bag for optimum carrying or power cart use.

The rotary hinge 65 provides multiple lockable pivot positions. A preferred hinge 65 is disclosed in U.S. Pat. No. 5,689,999, which is hereby incorporated by reference, and is commercially available under the VARILOC trademark. Still other hinge designs or receiving mechanisms can be used consistent with the basic invention, including hinges and receivers which permit detachment and removal of the entire handle 67 (for optimum carrying or power cart use).

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A hybrid golf bag which is selectively configurable between carry and pull modes for use as a carry bag, cart bag and pull bag, comprising:
   (a) a golf bag body with an open top and a closed bottom;
   (b) a wheel mount attached to said bottom;
   (c) at least two wheels rotatably connected to said wheel mount, said wheels having a retracted position where the wheels are disposed close to the body and an extended position where the wheels are disposed away from the body;
   (d) a stand coupled to said body, the stand including a pair of elongated legs and a leg actuator, each leg having a proximal end coupled to the body and a distal end adapted to engage the ground, the stand having a retracted position wherein the legs are held near the body and an extended position wherein the legs are moved away from the body for engagement with the ground to stabilize the golf bag, and
   (e) handle means attached to said golf bag body, said handle means including at least one shoulder carrying strap connected to the body and a push/pull handle connected to the body which has a retracted position and an extended position, whereby the bag is selectively useable for carrying, either on the user's shoulder or in a cart, where the wheels are in the retracted position, the stand is in the retracted position and the push/pull handle is in the retracted position, and alternatively whereby the bag is selectively useable for pulling where the wheels are in the extended position, the stand is in the retracted position and the push/pull handle is in the extended position.

2. The golf bag of claim 1, wherein said stand is normally in the retracted position, and is movable into and the extended position.

3. The golf bag of claim 1, further comprising a wheel latching mechanism adapted for securing said at least two wheels in said retracted position and in said extended position.

4. The golf bag of claim 1, wherein said wheel mount is formed with a wheel axle adapted to securely receive said at least two wheels.

5. The golf bag of claim 1, wherein said wheel mount is formed with two tandem sleeves adapted to receive two wheel axles of a predetermined length in one said sleeve to provide an extended wheel state wherein said wheels are disposed a predetermined first distance away from said golf bag body and is further adapted to receive said two wheel axles in two said sleeves to provide a retracted wheel state wherein said wheels are disposed a predetermined second distance away from said golf bag body, said first distance being greater than said second distance.

6. The golf bag of claim 5, wherein said wheel axles have quick release, hand depressible pins which mate with apertures in said sleeves.

7. The golf bag of claim 1, further comprising a handle latching mechanism adapted for securing said push/pull handle in said retracted position and in said extended position.

8. The golf bag of claim 1, wherein said push/pull handle comprises a post portion pivotally attached to a handle portion.

9. The golf bag of claim 8, wherein said handle means is removable from said golf bag.

10. The golf bag of claim 1, wherein said push/pull handle further comprises means to hand actuate said stand.

11. The golf bag of claim 10, wherein said means to actuate comprises a distal leg pull handle longitudinally movably coupled to said push/pull handle and having at least one cord connecting said pull handle to said stand, whereby the stand is retractable and extendible by the user at the distal handle end.

12. A hybrid golf bag which is selectively configurable between carry and pull modes for use as a carry bag, cart bag and pull bag, comprising:
   (a) a golf bag body with an open top and a closed bottom;
   (b) a wheel mount attached to said bottom;
   (c) at least two wheels rotatably connected to said wheel mount, said wheels having a retracted position where the wheels are disposed close to the body and an extended position where the wheels are disposed away from the body;
   (d) a stand coupled to said body, the stand including a pair of elongated legs and a leg actuator the stand having a retracted position wherein the legs are held near the body and an extended position wherein the legs are moved away from the body; and (e) handle means attached to said golf bag body, said handle means including at least one shoulder carrying strap connected to the body and a pivotable push/pull handle connected to the body which has a retracted position and an extended position, whereby the bag is selectively useable for carrying, either on the user's shoulder or in a cart, where the wheels are in the retracted position, the stand is in the retracted position and the push/pull handle is in the retracted position, and alternatively whereby the bag is selectively useable for pulling where the wheels are in the extended position, the stand is in the retracted position and the push/pull handle is in the extended position.

* * * * *